(12) United States Patent
Gu et al.

(10) Patent No.: US 10,595,345 B2
(45) Date of Patent: Mar. 17, 2020

(54) METHOD FOR ALLOCATING RANDOM ACCESS RESOURCES, BASE STATION, READABLE STORAGE MEDIUM AND ELECTRONIC DEVICE

(71) Applicant: SPREADTRUM COMMUNICATIONS (SHANGHAI) CO., LTD., Zhangjiang, Shanghai (CN)

(72) Inventors: Xiangxin Gu, Zhangjiang Shanghai (CN); Su Huang, Zhangjiang Shanghai (CN); Xinghang Gao, Zhangjiang Shanghai (CN); Wenqiang Tian, Zhangjiang Shanghai (CN); Yun Deng, Zhangjiang Shanghai (CN)

(73) Assignee: SPREADTRUM COMMUNICATIONS (SHANGHAI) CO., LTD., Zhangjiang, Shanghai (CN)

( * ) Notice: Subject to any disclaimer, the term of this patent is extended or adjusted under 35 U.S.C. 154(b) by 0 days.

(21) Appl. No.: 16/004,786

(22) Filed: Jun. 11, 2018

(65) Prior Publication Data
US 2018/0368186 A1  Dec. 20, 2018

(30) Foreign Application Priority Data

Jun. 16, 2017  (CN) .......................... 2017 1 0456481

(51) Int. Cl.
H04W 74/08  (2009.01)
H04W 56/00  (2009.01)
H04L 5/00  (2006.01)

(52) U.S. Cl.
CPC ......... *H04W 74/0833* (2013.01); *H04L 5/003* (2013.01); *H04W 56/001* (2013.01); *H04L 5/0053* (2013.01)

(58) Field of Classification Search
None
See application file for complete search history.

(56) References Cited

U.S. PATENT DOCUMENTS

2014/0233530 A1* 8/2014 Damnjanovic ....... H04W 48/12
                                                              370/331
2018/0332514 A1* 11/2018 Maaref ............. H04W 28/0215
2019/0150108 A1*  5/2019 Byun .................... H04W 76/30

* cited by examiner

*Primary Examiner* — Anh Ngoc M Nguyen
(74) *Attorney, Agent, or Firm* — Cantor Colburn LLP

(57) ABSTRACT

A method for allocating random access resources, a base station, a readable storage medium and an electronic device are provided. The method includes: obtaining the number of all the random access preambles, the predetermined number of random access channel resources, and a predetermined maximum value of SSB indexes; calculating the number of SSB groups according to the predetermined maximum value of the SSB indexes and the predetermined number of random access channel resources; and determining combinations of one random access preamble and one random access channel resource for each of SSBs according to the number of all the random access preambles and the number of the SSB groups. The method may reduce cost of MSI when the random access preambles and the random access channel resources are allocated for the SSBs.

11 Claims, 2 Drawing Sheets

METHOD FOR ALLOCATING RANDOM ACCESS RESOURCES, BASE STATION, READABLE STORAGE MEDIUM AND ELECTRONIC DEVICE

CROSS-REFERENCE TO RELATED APPLICATIONS

The present application claims priority under 35 U.S.C. § 119 to Chinese Patent Application No. 201710456481.0, filed on Jun. 16, 2017, the entire disclosure of which is incorporated herein by reference.

TECHNICAL FIELD

The present disclosure relates to the field of radio communication, and more particularly, to a method for allocating random access resources, a base station, a readable storage medium and an electronic device.

BACKGROUND

A beam sweeping mechanism is introduced in 5G New Radio (NR). Synchronization signals, minimum system information (MSI) and signals for the network to page UE (user equipment) required for an initial access of the UE to a cell are broadcast through the beam sweeping and cover the entire cell.

Currently, in the 5G NR standards, a synchronization signal and a PBCH (physical broadcast channel) carrying the basic system information are combined to constitute a SSB (synchronization signal block). Each of the SSBs carries a SSB index as an identifier. Random access signals sent by the UE for initial access or the like inform a 5G NodeB of the index of the SSB expected to access.

In a conventional technology, a mapping relationship between random access preambles and SSBs as well as that between random access channel resources and SSBs is assigned in the MSI, and the mapping relationship is given by a bitmap or a table.

However, the MSI space is limited, and the number of SSBs can be as many as 64. So that, the mapping relationship between random access preambles and SSBs as well as that between random access channel resources and SSBs requires large cost.

SUMMARY

Embodiments of the present disclosure provide a way to reduce cost of the MSI when random access preambles and random access channel resources are allocated for SSBs.

Embodiments of the present disclosure provide a method for allocating random access resources, where the random access resources include random access preambles and random access channel resources, and the method includes: obtaining the number of all the random access preambles, the predetermined number of random access channel resources, and a predetermined maximum value of SSB indexes; calculating the number of SSB groups according to the predetermined maximum value of the SSB indexes and the predetermined number of random access channel resources; and determining combinations of one random access preamble and one random access channel resource for each of SSBs according to the number of all the random access preambles and the number of the SSB groups. The SSB can be determined by the combinations.

In some embodiment, a following formula is applied to calculate the number of the SSB groups: N=Ceiling(M/A); where N is the number of the SSB groups, M is the predetermined maximum value of the SSB indexes, A is the number of the random access channel resources, and Ceiling (M/A) is a rounding up of the M/A.

In some embodiment, determining combinations of one random access preamble and one random access channel resource for each of SSBs includes: obtaining X which is the number of random access preambles for each of SSBs according to the number of SSB groups and the number of all random access preambles; obtaining a third modulo result by the index j of the j-th SSB performing a modulo operation on the number of the SSB groups; obtaining a first rounding result by rounding down the quotient of the index i of the i-th random access preamble to X which is the number of random access preambles for each of the SSBs; and assigning the i-th random access preamble into the combinations for the j-th SSB when the first rounding result is equal to the third modulo result; where the combinations of one random access preamble and one random access channel resource for the j-th SSB include: the i-th random access preamble and the k-th random access channel resource; where the index k of the k-th random access channel resource is calculated by a following formula: k=floor(j/N), where j is the index j of the j-th SSB, and N is the number of the SSB groups, and k=floor(j/N) represents rounding down j/N.

In some embodiment, the method further includes: detecting whether the number of random access requests reaches a predetermined value in every area in a cell; and when the number of random access requests in one area reaches the predetermined value, adjusting a distribution of the SSBs of the cell, increasing the number of the SSBs in the areas where the number of random access requests reaches the predetermined value, and reducing the number of the SSBs in the areas where the number of random access requests is less than the predetermined value.

In some embodiment, the method further includes: broadcasting the number of all the random access preambles and the number of the random access channel resources through system information.

Embodiments of the present disclosure provide a base station, including: an obtaining circuitry, configured to obtain the number of all random access preambles, the predetermined number of random access channel resources, and a predetermined maximum value of SSB indexes; a calculating circuitry, configured to calculate the number of SSB groups according to the predetermined maximum value of the SSB indexes and the predetermined number of the random access channel resources; and a determining circuitry, configured to determine combinations of one random access preamble and one random access channel resource for each of SSBs according to the number of all the random access preambles and the number of the SSB groups.

In some embodiment, the calculating circuitry is configured to apply a following formula to calculate the number of the SSB groups: N=Ceiling(M/A); where N is the number of the SSB groups, M is the predetermined maximum value of the SSB indexes, A is the number of the random access channel resources, and Ceiling (M/A) is a rounding up of the M/A.

In some embodiment, the determining circuitry, is configured to obtain X which is the number of random access preambles for each of SSB according to the number of SSB groups and the number of all random access preambles; and obtain a third modulo result by the index j of the j-th SSB performing a modulo operation on the number of the SSB groups; and obtain a first rounding result by rounding down the quotient of the index i of the i-th random access preamble to X which is the number of random access preambles for each of SSBs; and assign the i-th random access preamble into the combinations for the j-th SSB when the first rounding result is equal to the third modulo result; where the combinations of one of random access preamble and one random access channel resource for the j-th SSB include: the i-th random access preamble and the k-th random access channel resource; where the index k of the k-th random access channel resource is calculated by a following formula: k=floor(j/N), where j is the index j of the j-th SSB, and N is the number of the SSB groups, and k=floor(j/N) represents rounding down j/N.

In some embodiment, the base station further includes: a detecting circuitry, configured to detect whether the number of random access requests reaches a predetermined value in every area in a cell; and an adjusting circuitry, when the number of random access requests in one area reaches the predetermined value, configured to adjust a distribution of the SSBs of the cell, and increase the number of the SSBs in the areas where the number of random access requests reaches the predetermined value, and reduce the number of the SSBs in the areas where the number of random access requests is less than the predetermined value.

In some embodiment, the base station further includes: a broadcasting circuitry, configured to broadcast the number of all the random access preambles and the number of the random access channel resources through system information.

In some embodiment, a computer-readable storage medium is provided, which storing computer instructions where once the computer instructions are executed, steps of the method for allocating random access resources are performed.

In some embodiment, an electronic device is provided, which includes a memory and a processor, where the memory stores computer instructions executable on the processor, and the processor executes the method for allocating random access resources when executing the computer instructions.

Compared with a conventional technology, the present disclosure has following advantages.

The number of SSB groups is calculated according to the predetermined maximum value of the SSB indexes and the predetermined number of the random access channel resources. Combinations of one random access preamble and one random access channel resource are determined for each of SSBs according to the number of all the random access preambles and the number of the SSB groups. In this way, a mapping relationship between random access preambles and SSBs as well as that between random access channel resources and SSBs is realized. That is to say, only the number of the random access channel resources needs to be indicated in the MSI, and there is no need to indicate the mapping relationship between random access preambles and SSBs as well as that between random access channel resources and SSBs in the MSI, so that cost of MSI may be reduced.

Further, when it is detected that the number of the random access requests in every area of a cell reaches a predetermined value, it can be determined that the area is a high access load area. At this time, the distribution of the SSBs may be adjusted, for areas where the number of random access requests reaches the predetermined value, the number of the SSBs are adjusted to increase in the cell, and for areas where the number of random access requests does not reach the predetermined value, the number of the SSBs are adjusted to decrease in the cell. That is to say, for areas where the number of random access requests reaches the predetermined value, a spatial distribution of the SSBs is adjusted to increase in the cell, and for areas where the number of random access requests does not reach the predetermined value, the spatial distribution of the SSBs is adjusted to decrease in the cell, to adapt to dynamic changes of the access load in the cell.

DETAILED DESCRIPTION

In a conventional technology, a mapping relationship between random access preambles and SSBs as well as that between random access channel resources and SSBs is assigned to an MSI, and the mapping relationship is given by a bitmap or a table. The advantage of this method is that more random access preambles and random access channel resources can be allocated for SSBs with a high access load.

However, simply increasing random access preambles and random access channel resources may result in unbalance of paging resources. In addition, the MSI space is limited, and the number of SSBs can be as many as 64. So that, the mapping relationship between random access preambles and SSBs as well as that between random access channel resources and SSBs requires large cost.

In embodiments of the present disclosure, only the predetermined number of the random access channel resources needs to be indicated in the MSI, and there is no need to indicate the mapping relationship between random access preambles and SSBs as well as that between random access channel resources and SSBs in the MSI, so that the cost of MSI may be reduced.

The foregoing objects, features and advantages of the present disclosure will become more apparent from the following detailed description of specific embodiments of the disclosure taken in conjunction with the accompanying drawings.

Figure 1:
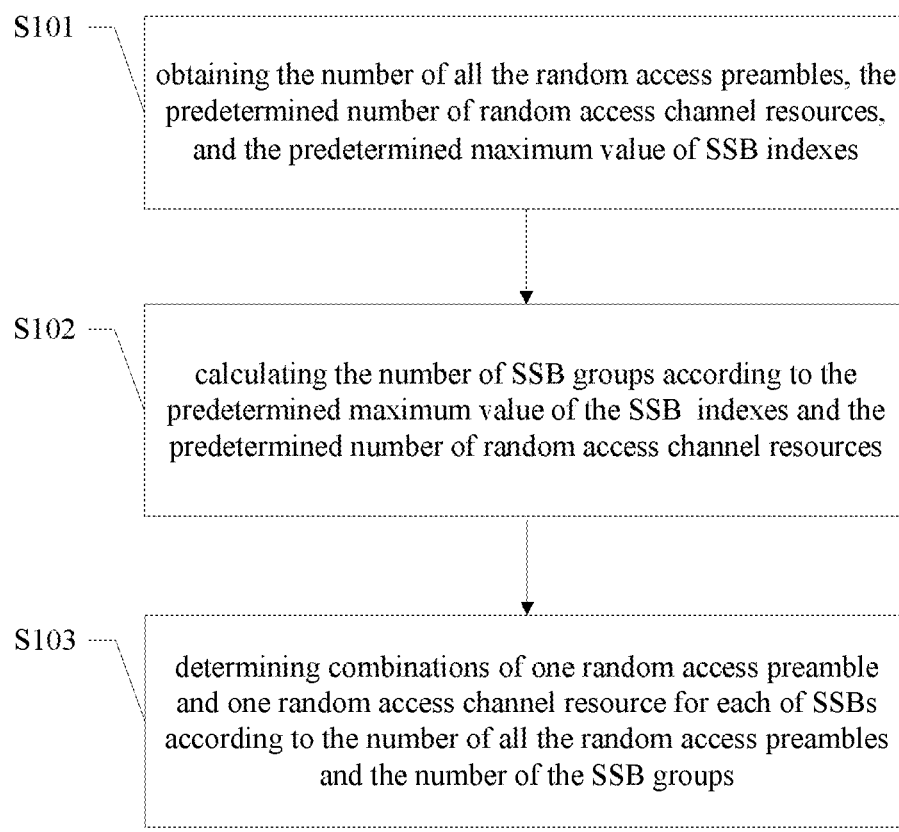
FIG. 1 schematically illustrates a flow chart of a method for allocating random access resources according to an embodiment of the present disclosure.

A method for allocating random access resources in embodiments of the present disclosure. Referring to FIG. 1, the method is described in detail through specific steps.

In some embodiment, it can be known that random access resources may include random access preambles and random access channel resources. Therefore, the method for allocating random access resource in the embodiment of the present disclosure actually allocates random access preambles and random access channel resources in different SSBs.

In S101, the number of all random access preambles, the predetermined number of random access channel resources, and a predetermined maximum value of SSB indexes are obtained.

In some embodiment, at a base station side, the number of all the random access preambles and the number of all random access channel resources groups may be predetermined, and a maximum value of SSB indexes may be predetermined, that is, the number of all SSBs may be predetermined.

In some embodiment, it can be known that random access preambles may include contention based random access preambles and non-contention based random access preambles. In some application scenarios, the non-contention based random access preambles are not configured for resource allocation. Therefore, the number of all the random access preambles obtained in embodiments of the present disclosure is the number of all the random access preambles configured for the allocation.

In some embodiment, when random access resources allocation is performed, if non-contention based random access preambles are not used for resources allocation, the number of all obtained random access preambles is the number of all contention based random access preambles. If non-contention based random access preambles are configured for resources allocation, in embodiments of the present disclosure, the number of all obtained random access preambles is a sum of the number of all contention based random access preambles and the number of all non-contention based random access preambles.

For example, the number of all predetermined random access preambles is 64, including 10 non-contention based random access preambles and 54 contention based random access preambles. If the 10 non-contention based random access preambles are not configured for random access resources allocation, in the embodiment of the present disclosure, the number of all the random access preambles configured for random access resources allocation is 54. If all random access preambles are allocated when random access resource allocation is performed, in the embodiment of the present disclosure, the number of all the random access preambles used for random access resource allocation is 64.

In some embodiment, the predetermined number of the random access channel resources may be set according to actual scenarios. For example, the predetermined number of the random access channel resources is set to 2. For another example, the predetermined number of the random access channel resources is set to 4. The predetermined number of the random access channel resources may be other values, which are not described here.

In some embodiment, the predetermined maximum value of the SSB indexes, that is, the number of all SSBs may also be set according to actual application scenarios. For example, when the access load at the base station side is relatively high, more SSBs are allocated; when the access load at the base station side is relatively low, fewer SSBs are allocated.

In S102, the number of SSB groups is calculated according to the predetermined maximum value of the SSB indexes and the predetermined number of the random access channel resources.

In some embodiment, in each random access channel resource, the SSBs may be grouped according to the predetermined maximum value of the SSB indexes and the predetermined number of the random access channel resources. Each of random access channel resource corresponds to a group of SSBs.

In some embodiment, the following formula (1) may be configured to calculate the number of synchronizing signal block groups, $$N=\text{Ceiling}(M/A) \quad (1),$$

where N is the number of the SSB groups, M is the predetermined maximum value of the SSB indexes, A is the number of the random access channel resources, and Ceiling (M/A) is a rounding up of the M/A.

For example, if the predetermined maximum value of the SSB indexes M is predetermined to 64, that is, the number of SSBs is predetermined to 64, and the number A of random access channel resources is set to 2, so that N=Ceiling(64/2)=32, which means each of random access channel resources corresponds to 32 SSBs.

In some embodiment, each of random access channel resources corresponds to a different SSB. For example, the number of all SSBs is 64, and SSB indexes range from 0 to 63; and the indexes of random access channel resources are 0 and 1 respectively. In the random access channel resource 0, SSB indexes range from 0 to 31; in the random access channel resource 1, SSB indexes range from 32 to 63. The number of the SSB groups for each of random access channel resources is 32.

In S103, combinations of one random access preamble and one random access channel resource for each of SSBs are determined according to the number of all the random access preambles and the number of the SSB groups.

In some embodiment, after the number of synchronizing signal block groups is calculated, with the number of all the random access preambles, combinations of one random access preamble and one random access channel resource for each of SSB may be obtained.

It can be seen that the base station only needs to indicate the predetermined number of the random access channel resources in the MSI, and the mapping relationship between random access preambles and SSBs as well as that between random access channel resources and SSBs can be obtained from operations without indicating the mapping relationship in the MSI, so that the cost of MSI may be reduced.

In some embodiment, the base station may further carry the number of all the random access preambles and the number of the random access channel resources in broadcast system information.

The method and process for determining combinations of one random access preamble and one random access channel resource for each of SSBs are described in detail in the following.

In some embodiment, X which is the number of random access preambles is calculated, corresponding to each of SSB according to the number of the SSB groups and the number of all random access preambles. A third modulo result is obtained by the index j of the j-th SSB performing a modulo operation on the number of the SSB groups. A first rounding result is obtained by rounding down the quotient of the index i of the i-th random access preamble to X which is the number of random access preambles for each of SSBs. The i-th random access preamble is assigned into the combinations for the j-th SSB when the first rounding result is equal to the third modulo result. The combinations of one of random access preamble and one random access channel resource for the j-th SSB include: the i-th random access preamble and the k-th random access channel resource.

The index k of the k-th random access channel resource can be calculated by the following formula (2), $$k=\text{floor}(j/N) \quad (2),$$

where j is the index j of the j-th SSB, and N is the number of the SSB groups, and k=floor(j/N) represents rounding down j/N.

In some embodiment, X which is the number of random access preambles for each of SSBs may be calculated by using the following formula (3), $$X=\text{floor}(R/N) \quad (3),$$

where R is the number of all the random access preambles, and floor(R/N) represents rounding down R/N.

In some embodiment, there may be a case that R/N is not an integer. Since X represents rounding down of the quotient of R/N, there is a case that some random access preambles cannot be grouped. At this time, the non-grouped random access preambles may not participate in resource allocation or be configured as other resource allocations.

In some embodiment, the following formula (4) may be configured to determine random access preambles for each of SSBs, $$\text{floor}(i/X)=(j \bmod N) \quad (4),$$

The formulas (2), (3) and (4) are described below through examples.

It is assumed that the number R of all random access preambles is 64, and the indexes range from 0 to 63 in order; the predetermined number of the random access channel resources is 2, and the indexes include 0 and 1; the number of all SSBs is 64, and the indexes range from 0 to 63 in order.

According to formula (1), the number of SSB groups is calculated to be 32, so that X=floor(R/N)=2. That is to say, the number of random access preambles for each of SSB is 2.

After the number of random access preambles for each of SSBs is determined, the index of the random access preamble for each SSB is determined.

When the index of the random access preamble is 0, i=0, so that floor(i/X)=0 is calculated by formula (3); when the index of the random access preamble is 1, i=1, so that floor(i/X)=0 is calculated by formula (4); when the index of the random access preamble is 2, i=2, so that floor(i/X)=1 is calculated by formula (4); by analogy, when the index of the random access preamble is 63, i=63, so that floor(i/X)=31 is calculated by formula (4).

When the index of the SSB is 0, j=0, so that j mod N=0 is calculated by formula (4); when the index of the SSB is 1, j=1, so that i mod N=0 is calculated by formula (4); by analogy, when the index of the SSB is 32, j mod N=0 is calculated by formula (4); when the index of the SSB is 33, j mod N=1 is calculated by formula (4). All indexes of SSBs are substituted into j mod N in formula (4), and the following results are obtained: when the indexes of SSBs include 0 and 32, obtained results of i mod N are equal; when the indexes of the SSBs include 1 and 33, obtained results of j mod N are equal; by analogy, when the indexes of the SSBs include 31 and 63, obtained results of j mod N are equal.

The SSB with index 0 corresponds to j mod N=0. When floor(i/X)=0, the indexes of corresponding random access preambles include 0 and 1 respectively. Therefore, the random access preambles for the SSB with index 0 are: the random access preamble with index 0 and the random access preamble with index 1.

Correspondingly, the SSB with index 1 corresponds to j mod N=1. When floor(i/X)=1, the indexes of corresponding random access preambles include 2 and 3 respectively. Therefore, the random access preambles for the SSB with index 1 include: the random access preamble with index 3 and the random access preamble with index 3.

By analogy, the SSB with index 31 corresponds to j mod N=31. When floor(i/X)=31, the indexes of corresponding random access preambles include 62 and 63 respectively. Therefore, the random access preambles for the SSB with index 31 include: the random access preamble with index 62 and the random access preamble with index 63.

The index of the random access channel resource for SSBs with indexes 0-31 is 0. For SSB with indexes 32-63, the index of the corresponding random access channel resource is 1.

The SSB with index 32 corresponds to j mod N=0. When floor(i/X)=0, the indexes of corresponding random access preambles include 0 and 1 respectively. Therefore, the random access preambles corresponding to the SSB with index 32 include: the random access preamble with index 0 and the random access preamble with index 1.

Correspondingly, the SSB with index 33 corresponds to j mod N=1. When floor(i/X)=1, the indexes of corresponding random access preambles include 2 and 3 respectively. Therefore, the random access preambles for the SSB with index 33 include: the random access preamble with index 2 and the random access preamble with index 3.

By analogy, the allocation result of random access resources is shown below.

The SSBs corresponding to the random access channel resource with index 0 include the SSBs with indexes 0-31. The random access preambles for the SSB with index 0 include the random access preamble with index 0, and the random access preamble with index 1. The random access preambles for the synchronization signal with index 1 include the random access preamble with index 2 and the random access preamble with index 3. The random access preambles for the synchronization signal with index 2 include the random access preamble with index 4 and the random access preamble with index 5. By analogy, the random access preambles for the synchronization signal with index 31 include the random access preamble with index 62 and the random access preamble with index 63.

The SSBs corresponding to the random access channel resource with index 1 include the SSBs with indexes 32-63. The random access preambles for the SSB with index 32 include the random access preamble with index 0, and the random access preamble with index 1. The random access preambles for the synchronization signal with index 33 include the random access preamble with index 2 and the random access preamble with index 3. The random access preambles for the synchronization signal with index 34 the random access preamble with index 4 and the random access preamble with index 5. By analogy, the random access preambles for the synchronization signal with index 63 include the random access preamble with index 62 and the random access preamble with index 63.

From the above embodiments of the present invention, it can be learned that, in embodiments of the present disclosure, random access preambles and random access channel resources are fully allocated during random resource allocation, and unbalance of paging resources may be effectively avoid. Moreover, in embodiments of the present disclosure, only the predetermined number of the random access channel resources needs to be indicated in the MSI, and there is no need to indicate the mapping relationship between random access preambles and SSBs as well as that between random access channel resources and SSBs in the MSI, so that the cost of MSI may be reduced.

In some embodiment, the base station side can also detect the random access request quantity in every area in a cell in real time, and determine in real time whether the number of the random access request in every area in the cell reaches a predetermined value. When the number of random access requests in a certain area in the cell reaches a predetermined value, it can be determined that the area is under a high access load condition. In this case, the base station side can adjust a spatial distribution of SSBs of the entire cell.

In some embodiment, for areas where the number of random access requests reaches the predetermined value in a cell, the base station side may adjust the spatial distribution of the SSBs so that the SSBs in the areas are denser; and for areas where the number of random access requests does not reach the predetermined value in a cell, the base station side may adjust the spatial distribution of the SSBs, so that the SSBs in the areas are sparser. By detecting in real time whether the number of the random access requests in each area of the cell reaches the predetermined value, the spatial distribution of the SSBs may be dynamically adjusted to adapt to the dynamic change of the access load in the cell.

In some embodiment, the predetermined value may also be set according to actual application scenarios.

Figure 2:
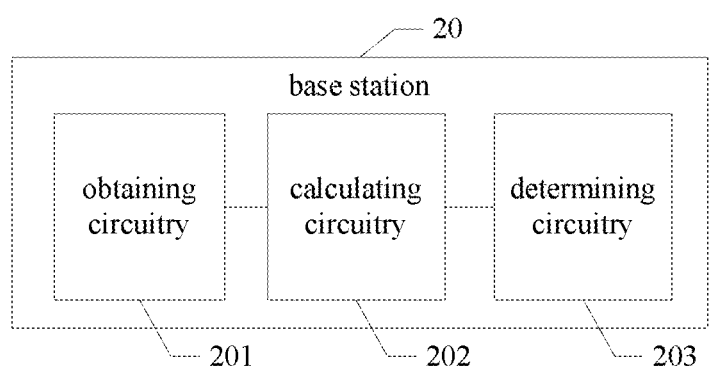
FIG. 2 schematically illustrates a structural diagram of a base station according to an embodiment of the present disclosure.

Referring to FIG. 2, a structural diagram of a base station according to an embodiment of the present disclosure is provided, the base station 20 includes: an obtaining circuitry 201, a calculating circuitry 202 and a determining circuitry 203.

The obtaining circuitry 201 is configured to obtain the number of all random access preambles, the predetermined number of random access channel resources, and a predetermined maximum value of SSB indexes.

The calculating circuitry 202 is configured to calculate the number of SSB groups according to the predetermined maximum value of the SSB indexes and the predetermined number of the random access channel resources.

The determining circuitry 203 is configured to determine combinations of one random access preamble and one random access channel resource for each of SSBs according to the number of all the random access preambles and the number of the SSB groups.

In some embodiment, the calculating circuitry 202 may be configured to apply a following formula to calculate the number of the SSB groups: $N=\text{Ceiling}(M/A)$; where N is the number of the SSB groups, M is the predetermined maximum value of the SSB indexes, A is the number of the random access channel resources, and Ceiling $(M/A)$ is a rounding up of the M/A.

In some embodiment, the determining circuitry 203 may be configured to obtain X which is the number of random access preambles for each of SSB according to the number of SSB groups and the number of all random access preambles; and obtain a third modulo result by the index j of the j-th SSB performing a modulo operation on the number of the SSB groups; and obtain a first rounding result by rounding down the quotient of the index i of the i-th random access preamble to X which is the number of random access preambles for each of SSBs; and assign the i-th random access preamble into the combinations for the j-th SSB when the first rounding result is equal to the third modulo result; where the combinations of one of random access preamble and one random access channel resource for the j-th SSB include: the i-th random access preamble and the k-th random access channel resource. The index k of the k-th random access channel resource is calculated by a following formula: $k=\text{floor}(j/N)$, where j is the index j of the j-th SSB, and N is the number of the SSB groups, and $k=\text{floor}(j/N)$ represents rounding down j/N.

In some embodiment, the base station further includes: a detecting circuitry, configured to check whether the number of random access requests reaches the predetermined value in each area of a cell; and an adjusting circuitry, configured to adjust a distribution of the SSBs of the cell when the number of random access requests in one area reaches the predetermined value; increase the number of SSBs in the areas where the number of random access requests reaches the predetermined value, and reduce the number of SSBs in the areas where the number of random access requests is less than the predetermined value.

In some embodiment, the base station further includes a broadcasting circuitry, configured to broadcast the number of all the random access preambles and the predetermined number of the random access channel resources through system information.

A computer-readable storage medium is further provided in embodiments of the present disclosure, and the computer-readable storage medium stores computer instructions, where the computer instructions execute steps of the method for allocating random access resources provided in embodiments of the present disclosure.

An electronic device is further provided in embodiments of the present disclosure, the electronic device includes a memory and a processor where the memory stores computer instructions executable on the processor and the processor executes the method for allocating random access resources provided in embodiments of the present disclosure when executing the computer instructions.

All or part of steps of above methods may be completed by relevant hardware once the program instruction are executed, and the program may be storage in a computer readable storage medium, such as a Read-Only memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the scope of the present disclosure.

What is claimed is:

1. A method for allocating random access resources, wherein the random access resources comprise random access preambles and random access channel resources, and the method comprises:

obtaining the number of all the random access preambles, the predetermined number of random access channel resources, and a predetermined maximum value of SSB (synchronization signal block) indexes;

calculating the number of SSB groups according to the predetermined maximum value of the SSB indexes and the predetermined number of random access channel resources; and determining combinations of one random access preamble and one random access channel resource for each of SSBs according to the number of all the random access preambles and the number of the SSB groups.

2. The method according to claim 1, wherein a following formula is applied to calculate the number of the SSB groups:

$$N=\text{Ceiling}(M/A);$$

wherein N is the number of the SSB groups, M is the predetermined maximum value of the SSB indexes, A is the number of the random access channel resources, and Ceiling (M/A) is a rounding up of the M/A.

3. The method according to claim 1, wherein determining combinations of one random access preamble and one random access channel resource for each of SSBs comprises:

obtaining X which is the number of random access preambles for each of SSBs according to the number of SSB groups and the number of all random access preambles;

obtaining a third modulo result by the index j of the j-th SSB performing a modulo operation on the number of the SSB groups;

obtaining a first rounding result by rounding down the quotient of the index i of the i-th random access preamble to X which is the number of random access preambles for each of the SSBs; and assigning the i-th random access preamble into the combinations for the j-th SSB when the first rounding result is equal to the third modulo result; wherein the combinations of one random access preamble and one random access channel resource for the j-th SSB comprise: the i-th random access preamble and the k-th random access channel resource;

wherein the index k of the k-th random access channel resource is calculated by a following formula: k=floor (j/N), wherein j is the index j of the j-th SSB, and N is the number of the SSB groups, and k=floor(j/N) represents rounding down j/N.

4. The method according to claim 1, further comprising:

detecting whether the number of random access requests reaches a predetermined value in every area in a cell; and when the number of random access requests in one area reaches the predetermined value, adjusting a distribution of the SSBs of the cell, increasing the number of the SSBs in the areas where the number of random access requests reaches the predetermined value, and reducing the number of the SSBs in the areas where the number of random access requests is less than the predetermined value.

5. The method according to claim 1, further comprising: broadcasting the number of all the random access preambles and the number of the random access channel resources through system information.

6. A base station, comprising:

an obtaining circuitry, configured to obtain the number of all random access preambles, the predetermined number of random access channel resources, and a predetermined maximum value of SSB (synchronization signal block) indexes;

a calculating circuitry, configured to calculate the number of SSB groups according to the predetermined maximum value of the SSB indexes and the predetermined number of the random access channel resources; and a determining circuitry, configured to determine combinations of one random access preamble and one random access channel resource for each of SSBs according to the number of all the random access preambles and the number of the SSB groups.

7. The base station according to claim 6, wherein the calculating circuitry is configured to apply a following formula to calculate the number of the SSB groups:

$N = \text{Ceiling}(M/A)$;

wherein N is the number of the SSB groups, M is the predetermined maximum value of the SSB indexes, A is the number of the random access channel resources, and Ceiling (M/A) is a rounding up of the M/A.

8. The base station according to claim 6, wherein the determining circuitry, is configured to obtain X which is the number of random access preambles for each of SSB according to the number of the SSB groups and the number of all random access preambles; and obtain a third modulo result by the index j of the j-th SSB performing a modulo operation on the number of the SSB groups; and obtain a first rounding result by rounding down the quotient of the index i of the i-th random access preamble to X which is the number of random access preambles for each of SSBs; and assign the i-th random access preamble into the combinations for the j-th SSB when the first rounding result is equal to the third modulo result; wherein the combinations of one of random access preamble and one random access channel resource for the j-th SSB comprise: the i-th random access preamble and the k-th random access channel resource; wherein the index k of the k-th random access channel resource is calculated by a following formula: k=floor(j/N), wherein j is the index j of the j-th SSB, and N is the number of the SSB groups, and k=floor(j/N) represents rounding down j/N.

9. The base station according to claim 6, further comprising:

a detecting circuitry, configured to detect whether the number of random access requests reaches a predetermined value in every area in a cell; and an adjusting circuitry, when the number of random access requests in one area reaches the predetermined value, configured to adjust a distribution of the SSBs of the cell, and increase the number of the SSBs in the areas where the number of random access requests reaches the predetermined value, and reduce the number of the SSBs in the areas where the number of random access requests is less than the predetermined value.

10. The base station according to claim 6, further comprising: a broadcasting circuitry, configured to broadcast the number of all the random access preambles and the number of the random access channel resources through system information.

11. A non-transitory computer-readable storage medium, storing computer instructions, wherein once the computer instructions are executed, steps of the method for allocating random access resources according to claim 1 are performed.

* * * * *